US009959009B1

(12) United States Patent
Duman et al.

(10) Patent No.: US 9,959,009 B1
(45) Date of Patent: May 1, 2018

(54) METHOD FOR DISPLAYING INFORMATION, AND TERMINAL EQUIPMENT

(71) Applicant: Beijing Kingsoft Internet Security Software Co., Ltd., Beijing (CN)

(72) Inventors: Hujia Duman, Beijing (CN); Ruimin Huang, Beijing (CN); Bo Chen, Beijing (CN); Wen-Chen Feng, Beijing (CN); Qingqing Yu, Beijing (CN); Ni Gan, Beijing (CN); Xinwei Wu, Beijing (CN); Jiabo Zhou, Beijing (CN); Xiaoming Sun, Beijing (CN); Ling Yu, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days. days.

(21) Appl. No.: 15/418,215

(22) Filed: Jan. 27, 2017

Related U.S. Application Data

(63) Continuation of application No. PCT/CN2016/111828, filed on Dec. 23, 2016.

(51) Int. Cl.
| G06F 3/00 | (2006.01) |
| G06F 3/048 | (2013.01) |
| G06F 3/0481 | (2013.01) |
| G06F 3/0488 | (2013.01) |
| G06F 3/0484 | (2013.01) |
| G06F 17/21 | (2006.01) |

(Continued)

(52) U.S. Cl.
CPC ........ *G06F 3/0481* (2013.01); *G06F 3/04845* (2013.01); *G06F 3/04883* (2013.01); *G06F 9/445* (2013.01); *G06F 17/212* (2013.01)

(58) Field of Classification Search
None
See application file for complete search history.

(56) References Cited

U.S. PATENT DOCUMENTS

| 5,303,388 A * | 4/1994 | Kreitman ............ G06F 3/04815 715/836 |
| 7,047,502 B2 * | 5/2006 | Petropoulos .......... G06F 3/0481 707/E17.082 |

(Continued)

FOREIGN PATENT DOCUMENTS

| CN | 102035936 | 4/2011 |
| CN | 102405462 | 4/2012 |
| CN | 102521034 | 6/2012 |

*Primary Examiner* — Yongjia Pan
(74) *Attorney, Agent, or Firm* — Norton Rose Fulbright US LLP

(57) ABSTRACT

Embodiments of the present application disclose a method for displaying information and a terminal equipment, and relate to the technical field of computers, wherein, the above method comprises: detecting whether a display screen of a terminal equipment switches from a screen-off state to a screen-on state when the display screen is in the screen-off state; if so, displaying at least one information card on the display screen, wherein, the size of the information card is smaller than that of the display screen; each information card includes information obtained from a program of the terminal equipment. By applying the solution provided by the embodiments of the present application, the usage of spare time of users can be improved.

26 Claims, 7 Drawing Sheets

(51) Int. Cl.
　　　*G06F 9/445* (2018.01)
　　　*G06F 3/033* (2013.01)
　　　*G06F 3/14* (2006.01)

(56) References Cited

U.S. PATENT DOCUMENTS

| | | | | |
|---|---|---|---|---|
| 8,134,727 B1* | 3/2012 | Shmunis | ............. | G06Q 10/107 358/1.13 |
| 8,423,995 B2* | 4/2013 | Hsieh | ................ | G06F 3/0483 709/203 |
| 8,830,270 B2* | 9/2014 | Zaman | ............... | G06F 3/04883 345/473 |
| 2003/0189598 A1 | 10/2003 | Lipstein et al. | ............. | 345/781 |
| 2005/0204306 A1* | 9/2005 | Kawahara | ............ | G06F 3/0481 715/782 |
| 2006/0242595 A1* | 10/2006 | Kizumi | ................ | G06F 3/0485 715/786 |
| 2008/0168382 A1* | 7/2008 | Louch | ................ | G06F 3/0488 715/781 |
| 2008/0220752 A1* | 9/2008 | Forstall | ................ | H04M 1/56 455/415 |
| 2008/0244653 A1* | 10/2008 | Marshall | ........... | H04N 5/44543 725/40 |
| 2010/0095240 A1* | 4/2010 | Shiplacoff | ............ | G06F 3/0483 715/784 |
| 2010/0146384 A1* | 6/2010 | Peev | ................ | H04M 1/673 715/255 |
| 2010/0159995 A1* | 6/2010 | Stallings | ............... | G06F 3/0488 455/566 |
| 2010/0211908 A1* | 8/2010 | Luk | ....................... | G06F 3/0485 715/786 |
| 2010/0248689 A1* | 9/2010 | Teng | ....................... | H04M 1/67 455/411 |
| 2012/0054673 A1* | 3/2012 | Kim | ....................... | G06F 3/0482 715/784 |
| 2012/0272230 A1* | 10/2012 | Lee | ........................ | G06F 1/329 717/173 |
| 2012/0331548 A1* | 12/2012 | Tseng | ..................... | G06F 21/31 726/19 |
| 2013/0057587 A1* | 3/2013 | Leonard | ................ | G06F 3/0488 345/660 |
| 2013/0063443 A1* | 3/2013 | Garside | ................ | G06T 15/005 345/473 |
| 2013/0100044 A1* | 4/2013 | Zhao | ..................... | G06F 1/1694 345/173 |
| 2013/0225238 A1* | 8/2013 | He | ........................ | G06F 1/3234 455/558 |
| 2014/0282084 A1* | 9/2014 | Murarka | ................ | H04L 51/32 715/752 |
| 2014/0282214 A1* | 9/2014 | Shirzadi | ............ | G06F 3/04883 715/781 |
| 2014/0289683 A1* | 9/2014 | Park | ...................... | G06F 3/0488 715/863 |
| 2015/0067596 A1* | 3/2015 | Brown | ................. | G06F 3/0416 715/808 |
| 2015/0067605 A1* | 3/2015 | Zambetti | ............ | G06F 3/0485 715/830 |
| 2015/0092520 A1* | 4/2015 | Robison | ................ | G04G 21/02 368/9 |
| 2016/0018914 A1* | 1/2016 | Kuo | ........................ | H04M 1/67 345/173 |
| 2016/0044091 A1* | 2/2016 | Doumet | ................. | H04L 67/10 715/745 |
| 2016/0147412 A1* | 5/2016 | Love | ..................... | G06F 17/212 715/823 |

* cited by examiner

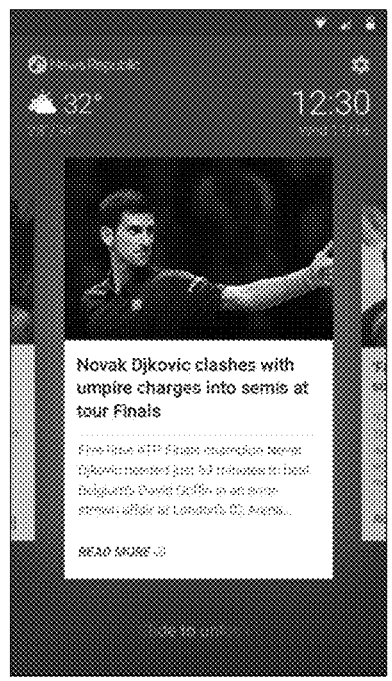
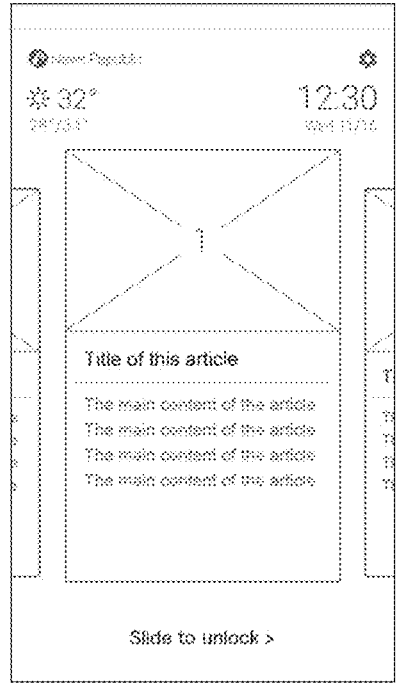
Fig. 5e          Fig. 5f
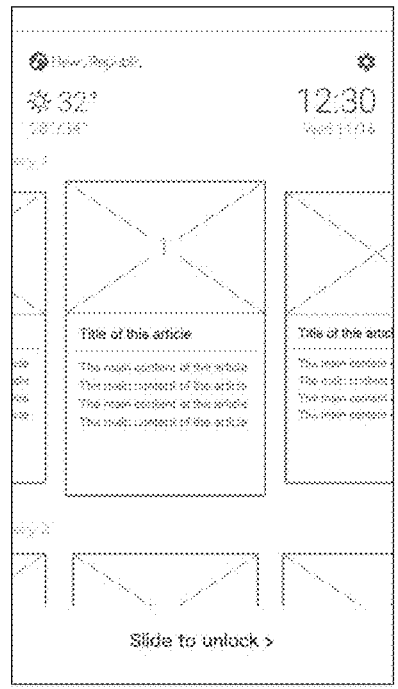
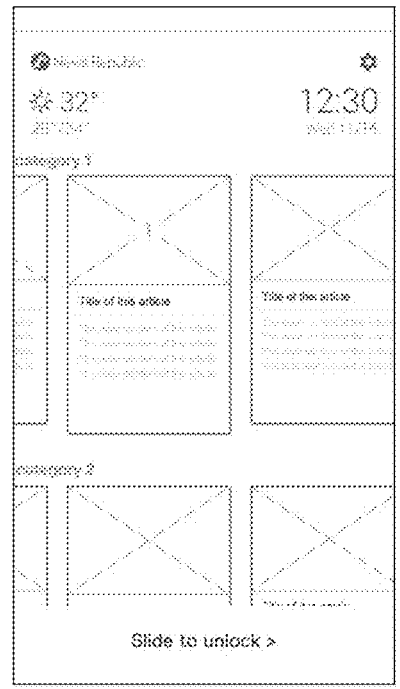
Fig. 5g          Fig. 5h

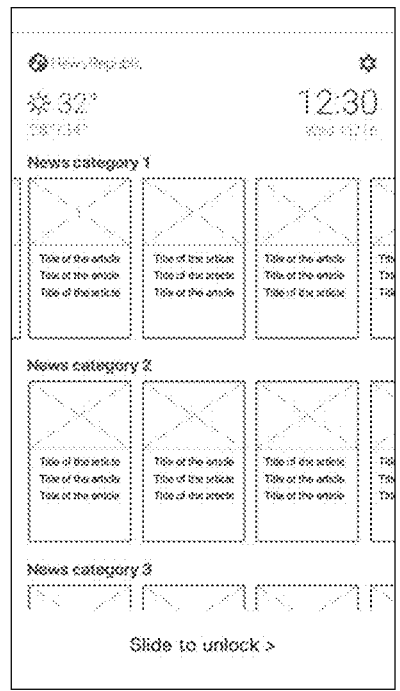 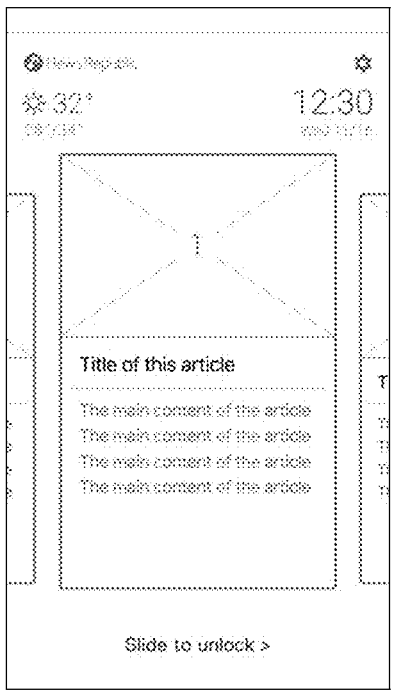
Fig. 5i　　　　　　　　Fig. 5j
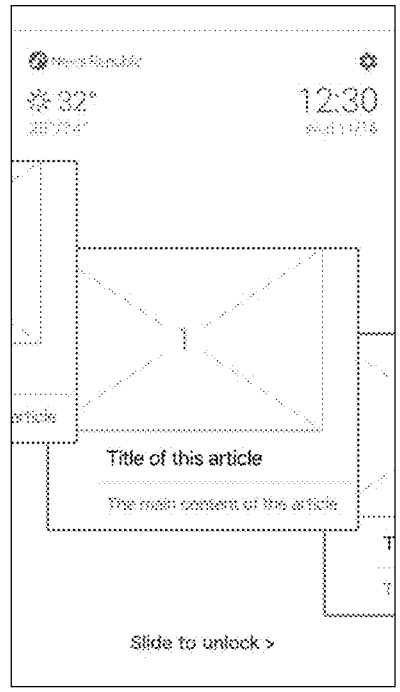 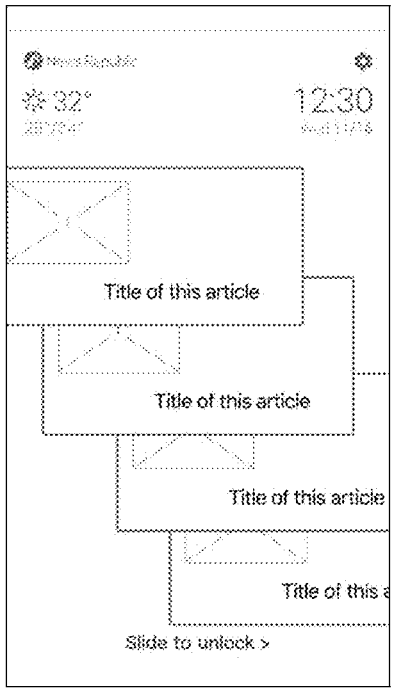
Fig. 5k　　　　　　　　Fig. 5l

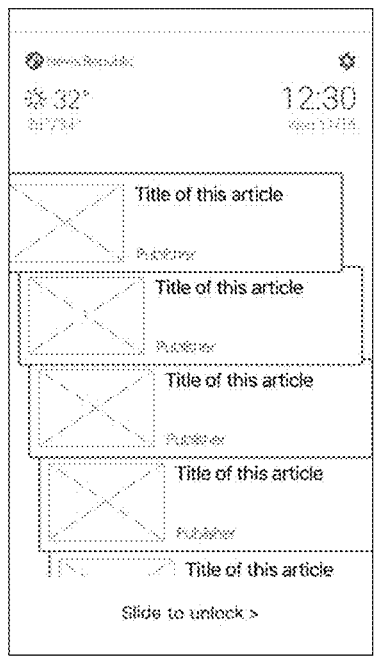
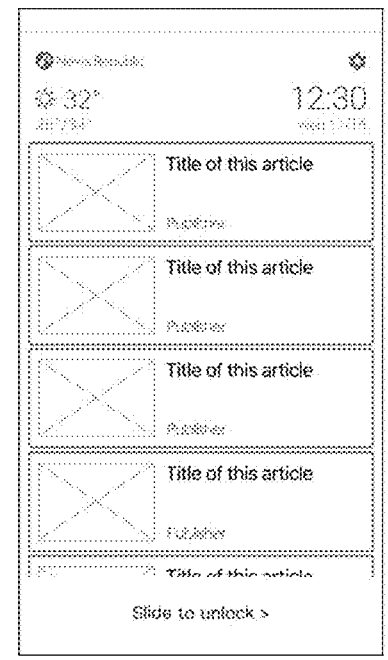
Fig. 5m  Fig. 5n
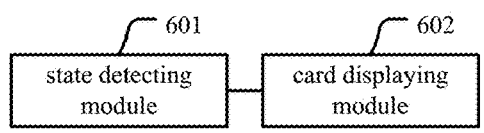
Fig. 6
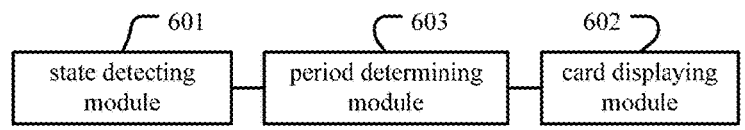
Fig. 7
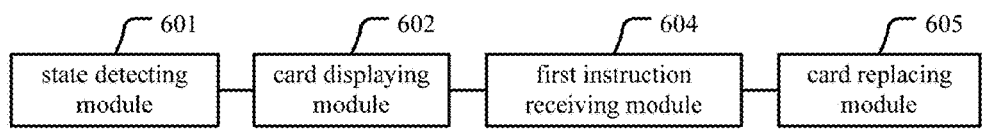
Fig. 8

METHOD FOR DISPLAYING INFORMATION, AND TERMINAL EQUIPMENT

CROSS REFERENCE TO RELATED APPLICATION

The present application is a continuation of International Application No. PCT/CN2016/111828, filed Dec. 23, 2016. The contents of the above-referenced application are incorporated into the present application by reference.

TECHNICAL FIELD

The present application relates to the technical field of computer, and particularly to a method for displaying information and a terminal equipment.

BACKGROUND

At present, with more and more powerful functions of a terminal equipment, users can use the terminal equipment to perform a variety of operations, and meanwhile users rely more and more on the terminal equipment. For example, a user may light up the display screen of a terminal equipment display very frequently, but after the lighting of the display screen, the user does not necessarily perform other operations.

In other words, users may have some spare time without any arrangement. In the existing terminal applications, the spare time of users cannot be utilized.

SUMMARY OF THE INVENTION

Embodiments of the present application disclose a method and device for displaying information, to improve the information usage of users.

In order to achieve the above objective, the embodiments of the present application disclose a method for displaying information, which comprises:

detecting whether a display screen of a terminal equipment switches from a screen-off state to a screen-on state when the display screen is in the screen-off state;

if so, displaying at least one information card on the display screen, wherein, the size of the information card is smaller than that of the display screen; each information card includes information obtained from a program of the terminal equipment.

In order to achieve the above objective, the embodiments of the present application disclose a device for displaying information, which comprises:

a state detecting module, for detecting whether a display screen of a terminal equipment switches from a screen-off state to a screen-on state when the display screen is in the screen-off state;

a card displaying module, for displaying at least one information card on the display screen when the detection result from the state detecting module is YES, wherein, the size of the information card is smaller than that of the display screen; each information card includes information obtained from a program of the terminal equipment.

In order to achieve the above objective, the embodiments of the present application disclose a terminal equipment, which comprises: a processor, a memory, a communication interface, an input/output interface and a bus, wherein the processor, the memory, the communication interface and the input/output interface are connected to the bus respectively, the memory being used for storing executable program codes; the possessor executing a program corresponding to the executable program codes by reading the executable program codes stored in the memory, so as to perform the method for displaying information provided in various implementations above.

In order to achieve the above objective, the embodiments of the present application disclose an application program, which is used for performing the method for displaying information provided in various implementations above in operation.

In order to achieve the above objective, the embodiments of the present application disclose a storage medium, which is used for storing executable codes that are configured to perform the method for displaying information provided in various implementations above.

It can be seen from above that, in the solution provided by the embodiments of the present application, when it is detected that a display screen of a terminal equipment switches from a screen-off state to a screen-on state when the display screen is in the screen-off state, at least one information card being displayed on the display screen, wherein, the size of the information card is smaller than that of the display screen; each information card includes information obtained from a program of the terminal equipment. The switching of a display screen from a screen-off state to a screen-on state means that the user may be free, in which case, information is displayed in a form of an information card, and the displayed information may be the information required by the user, thus the user can browse information during the his/her spare time, thereby improving the usage of users' spare time.

BRIEF DESCRIPTION OF DRAWINGS

In order to describe the embodiments of the present application and the technical solutions in the prior art more clearly, drawings required for embodiments of the present application and the prior art will be described briefly below. It is obvious that the drawings below are for only some embodiments of the present application, and those skilled in the art can also obtain further drawings based on these drawings without any creative efforts.

FIGS. 5a to 5e are schematic diagrams of interfaces for displaying information provided by the embodiments of the present application;

FIGS. 5f to 5n are line drawings of interfaces for displaying information provided by the embodiments of the present application;

FIG. 6 is a schematic structural diagram of a first device for displaying information provided by the embodiments of the present application;

FIG. 7 is a schematic structural diagram of a second device for displaying information provided by the embodiments of the present application;

FIG. 8 is a schematic structural diagram of a third device for displaying information provided by the embodiments of the present application;

DETAILED DESCRIPTION OF THE INVENTION

In order to make the objectives, technical solutions as well as advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without doing creative works fall into the protection scope defined by the present application.

It should be noted that, various embodiments of the present application can be performed by a client installed in a terminal equipment, an plug-in directly based on the above client or directly based on the operating system and the like, the above terminal equipment can be a mobile phone, a tablet computer, a desktop computer and a notebook computer and the like.

The method for displaying information provided by the present application will be described in detail below through specific embodiments.

Figure 1:
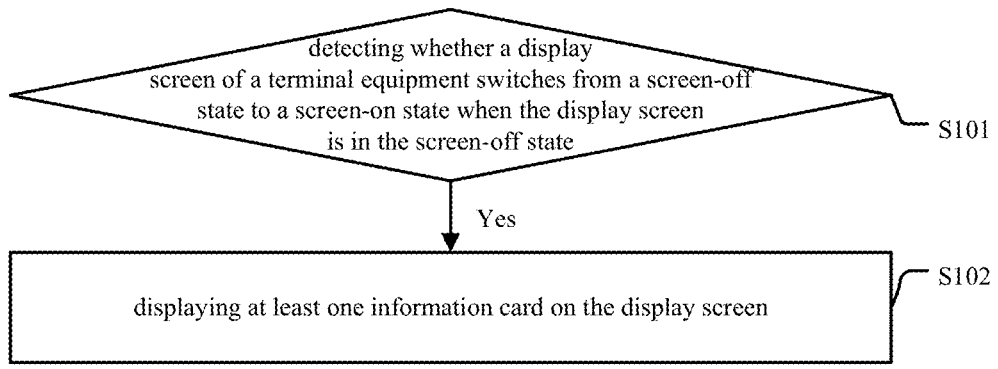
FIG. 1 is a schematic flowchart of a first method for displaying information provided by the embodiments of the present application.

FIG. 1 is a schematic flowchart of a first method for displaying information provided by the embodiments of the present application, which comprises:

S101: detecting whether a display screen of a terminal equipment switches from a screen-off state to a screen-on state when the display screen is in the screen-off state; and if so, performing S102.

During the process that a user uses a terminal equipment, in the first case, for convenient operation, the terminal equipment is not provided with locked-screen settings; in the second case, in view of the factors such as privacy of individuals and prevention of misoperation, the terminal equipment is provided with locked-screen settings. In both of the above two cases, the display screen will possibly switch from a screen-off state to a screen-on state.

Wherein, in the above second case, a situation of switching from a screen-off state to a screen-on state is as follows:

if a user performs no operation on the terminal equipment within a certain period of time after a display screen is in a screen-on state (e.g., the user is concentrated on reading the texts displayed on the display screen and performs no operation on the terminal equipment), for sake of saving power and the like, firstly, the display screen is normally switched from the screen-on state to a screen-off state, and in this case, the user may also need to perform further operations on the terminal equipment; in order to prevent unlocking the terminal equipment frequently, normally, the terminal equipment is locked only after the display screen is in the screen-off state for a certain period of time, and at this time, the user can trigger the switch of the display screen from the screen-off state to the screen-on state by the operations such as lightly touching the display screen. In this case, the user often wants to view the content displayed on the display screen before the screen was dark, and it may bring trouble to the user to show the user other content at this time, reducing the user experience.

Therefore, based on the above, in a specific implementation of the present application, it is possible to detect whether a display screen switches from the screen-off state to the screen-on state when the terminal equipment is in a locked-screen state. That is to say, the detection of whether a display screen of a terminal equipment switches from a screen-off state to a screen-on state is only carried out when the display screen is in the screen-off state and the terminal equipment is in a locked-screen state.

As is often the case, a user performs a locked-screen operation on a terminal equipment only when he/she is not in the need of continuing to operate the terminal equipment, thus, the solution provided by the embodiments of the present application is applied only when it is detected the display screen switches from a screen-off state to a screen-on state with the display screen in a locked-screen state, which will not bring any trouble to the user, and instead bring more redundant information to the user such that the spare time of the user can be utilized.

It should be noted that, the display screen mentioned in the embodiments of the present application, when it is needed to receive touch information input by a user, can be understood as a display screen that is capable of receiving touch information, and in other cases can be understood as a display screen that is only capable of displaying.

S102: displaying at least one information card on the display screen.

Wherein, the size of the information card is smaller than that of the display screen; each information card includes information obtained from a program of the terminal equipment. For example, an information card is used for displaying information from WeChat and an information card is used for displaying information from a weather information client, thereby enabling users to visually know the source of the displayed information.

The above information card can be understood as an aggregation carrier of information control and information display and provide an interface for information control and information display.

In particular, the above information card can be used only for information display, and can also be used for both information display and information input, for which the present application is not limited.

In addition, the above information card can be displayed on the top layer of a display interface and can also be displayed on other layers of a display interface, for example, displayed on the second layer of the display interface in a partially covered manner.

The amount of information obtained from each program of a terminal equipment may be different. In view of this, in one implementation of the present application, in order to ensure that users can watch all information on an information card with a limited area, it is possible to display all information on an information card for users with the aid of sliding upward and downward.

In terms of program installation, the above program in a terminal equipment can be a program that is pre-installed in the terminal equipment when it is manufactured, and can also be a program that is installed by a user in the process of using the terminal equipment.

In terms of the type of program, the above program in a terminal equipment can be a third-party client (or referred to as APP (application)), in this case, the information obtained from a program can be understood as the related information obtained from a corresponding server by a client, such as the latest updated messages of public account obtained from a WeChat server by a WeChat client, the weather information obtained by a weather forecast client from a corresponding server thereof; the above program in a terminal equipment can be other non-client programs, such as an operating system program used to obtain a plug-in, a driver of information in the operating system level; in this case, the information obtained from a program can be understood as the locally obtained operating system information, terminal hardware information, the operation information of a client and the like, such as power information, memory information, client abnormally operating information.

In a specific implementation of the present application, the above information obtained from a program of a terminal equipment can be information obtained from a program of a terminal equipment before a display screen switches from a screen-off state to a screen-on state. That is to say, the above information obtained from a program of a terminal equipment can be obtained in advance, and thus, it is possible to quickly display an information card to a user after it is detected that the display screen switches from a screen-off state to a screen-on state.

In addition, the above information obtained from a program of a terminal equipment can also be information obtained from a program of a terminal equipment after the display screen switches from a screen-off state to a screen-on state. Since information obtained by various programs in a terminal equipment at each moment may be different, the information to be displayed is only obtained after it is detected that a display screen switches from a screen-off state to a screen-on state, which ensures to display newest and more accurate information to users.

Optionally, the information included in each information card (hereinafter referred to as: first information) can be information directly obtained from a program of a terminal equipment (hereinafter referred to as: second information); the above first information can be information obtained after the edition of the second information, for which the present application is not limited.

Take a weather forecast client for example, assume that the above second information includes weather information in Beijing from today for a total of 7 days, wherein, the weather information includes highest temperature, lowest temperature, air pollution index and so on. In one case, the first information can be all of the above information, i.e., weather information in Beijing from today for a total of 7 days; in another case, the above first information can only be the highest temperature, lowest temperature, air pollution index in Beijing today.

Figure 5A:
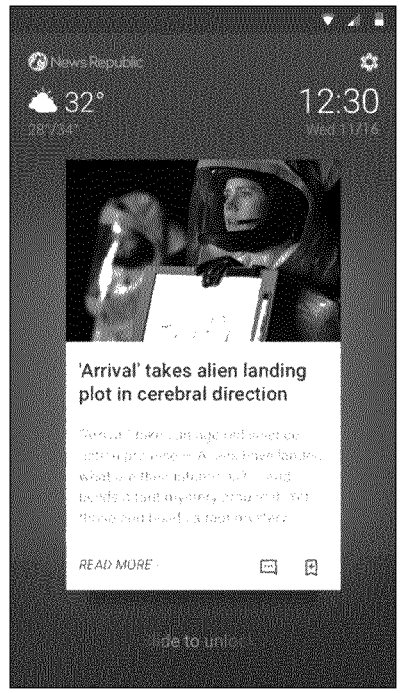

In particular, the information obtained from a program of a terminal equipment and included in each information card can include multimedia resource such as images, video, and can also include information such as texts. In the case that both multimedia resources and texts are included, during the display of an information card on a display screen, the information card can comprise a multimedia resource displaying region and a text region. For example, the information on an information card can be displayed in such a manner that images are displayed in the upper region and texts are displayed in the lower region, as shown in FIG. 5a. Of course, it is also possible to display in a mixed arrangement of images and texts and in a horizontal arrangement of images and texts.

In FIG. 5a, the information is displayed in the middle region of a screen in the form of a large information card, which can not only display more information to users, but also can bring greater visual impacts to users, and thus enables to display information in an elegant posture.

Because terminal equipments are more and more important in people's life, the present applicant has tracked the habits of people using terminal equipments and it has been found from the detailed analysis that the common operations on a display screen of a terminal device are horizontally sliding operations, i.e., leftward or rightward sliding operations on a display screen, especially horizontally sliding operations in the middle region of a display screen.

In view of above, in one implementation of the present application, when at least one information card is displayed on a display screen, it is possible to display the at least one information card on the display screen with cards arranged horizontally.

Specifically, during the display of at least one information card on a display screen with cards arranged horizontally, the information card currently displayed on the display screen (hereinafter referred to as the currently displayed information card) are displayed in a non-full-screen mode. Optionally, the currently displayed information card is displayed in the middle region of the display screen, i.e., the currently displayed information card can be displayed in the middle region of the display screen in a non-full-screen mode, as shown in FIG. 5a, the currently displayed information card is spaced with four edges of the display screen by a certain distance. The currently displayed information card can be rectangular or square. The size and shape of the currently displayed information card can be determined according to the size of the display screen of the current terminal equipment.

In addition, the information card can also have a card background. Specifically, when the information displayed by the currently displayed information card is system information, the desktop picture of a terminal equipment can be used as the current card background of the current card; when the information displayed by the currently displayed information card is the corresponding information of the above client, the related images of this client can be used as the card background of the currently displayed information card, such as a client startup interface diagram (such as the earth image of WeChat, the penguin image of QQ and the like), the LOGO diagram of a client.

It can be seen from above that, in the solution provided by various embodiments above, when it is detected that a display screen of a terminal equipment switches from a screen-off state to a screen-on state in the case that the display screen is in the screen-off state, at least one information card is displayed on the display screen, wherein, the size of the information card is smaller than that of the display screen; each information card includes information obtained from a program of the terminal equipment. The switching of a display screen from a screen-off state to a screen-on state means that the user may be free. In this case, display information in a form of an information card, and the displayed information may be the required information for the user, thus the user can browse information during the his/her spare time, thereby improving the usage of user's spare time.

Figure 2:
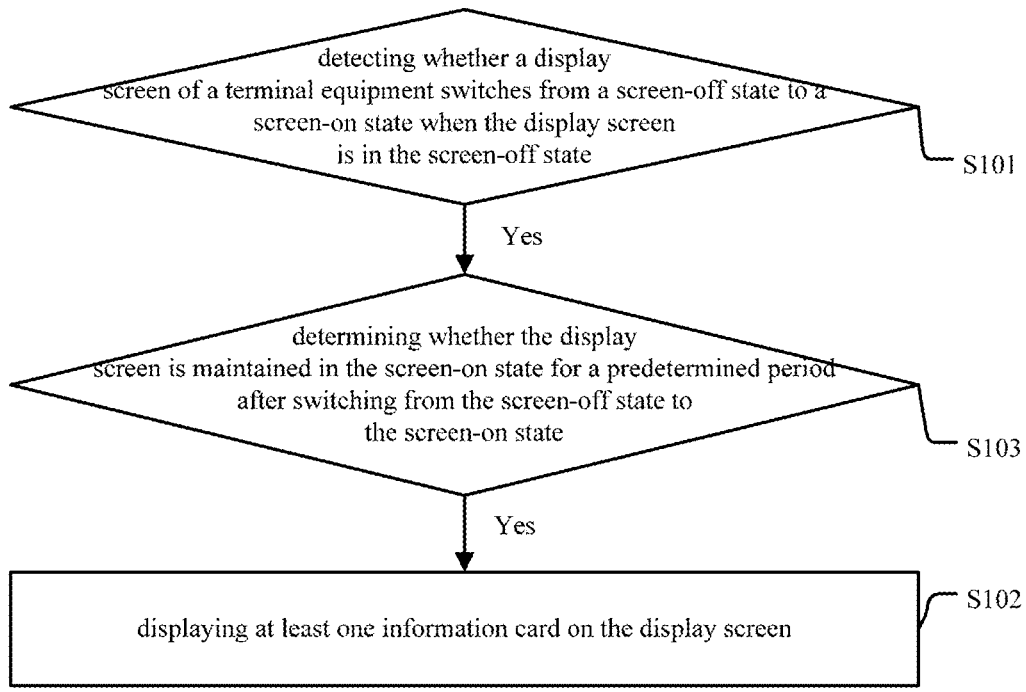
FIG. 2 is a schematic flowchart of a second method for displaying information provided by the embodiments of the present application.

During the process of a user using a terminal equipment, the display screen may be lightened due to factors such as misoperation and just watching the time. In this case, the user tends to turn off the display screen within a short period of time. Based on this, in one implementation of the present application, refer to FIG. 2, which provides a flowchart of a second information displaying method, as compared to the above various embodiments, in the present embodiment, before the step S102 of playing at least one information card on a display screen, the method further comprises:

S103: determining whether the display screen is maintained in the screen-on state for a predetermined period after switching from the screen-off state to the screen-on state, and if so, performing S102.

The predetermined period can be 3 seconds, 5 seconds and so on. The specific value can be set by the developer based on the experimental results, and can also set by users according to their own behavior customs, for which the present application is not limited.

In this way, it can effectively avoid the information display by lighting up a display screen due to the factors such as user's misoperation, viewing information for a short time and so on, thereby leading to an improved well-directed information display.

Based on the above various cases, in a specific implementation of the present application, it is possible to perform the above step S103 only when the current terminal is in a locked-screen state, thus leading to a further improved well-directed information display.

A person skilled in the art can appreciate that, in a terminal equipment, there may be a plurality of programs that are capable of obtaining information, thus the display of information requires a plurality of information cards. And the number of information cards that can be displayed on a display screen is limited, therefore, it is only possible to display more comprehensive information to users through sliding cards. Specifically, the currently displayed information card on a display screen can be referred to as the currently displayed information card.

During the selection of the currently displayed information card from numerous information cards, it is possible to select according to the predetermined program displaying sequence and use the information card corresponding to the program of the highest priority as the currently displayed information card, wherein the above program displaying sequence can be preset by users in advance; and it can also be a sequence determined according to the information such as the frequency of a user using various programs and types of various programs; and it can also be a sequence determined according to the message updating time of various programs, for example, a newer message updating time represents a higher priority of a program; and it can also be a sequence according to the default priority, for example, the priority of a program for an operating system level can be considered as being higher than that of a common third-party client, and the like. This is only illustrated an example of the present application, and does not constitute a limitation to the present application.

Figure 3:
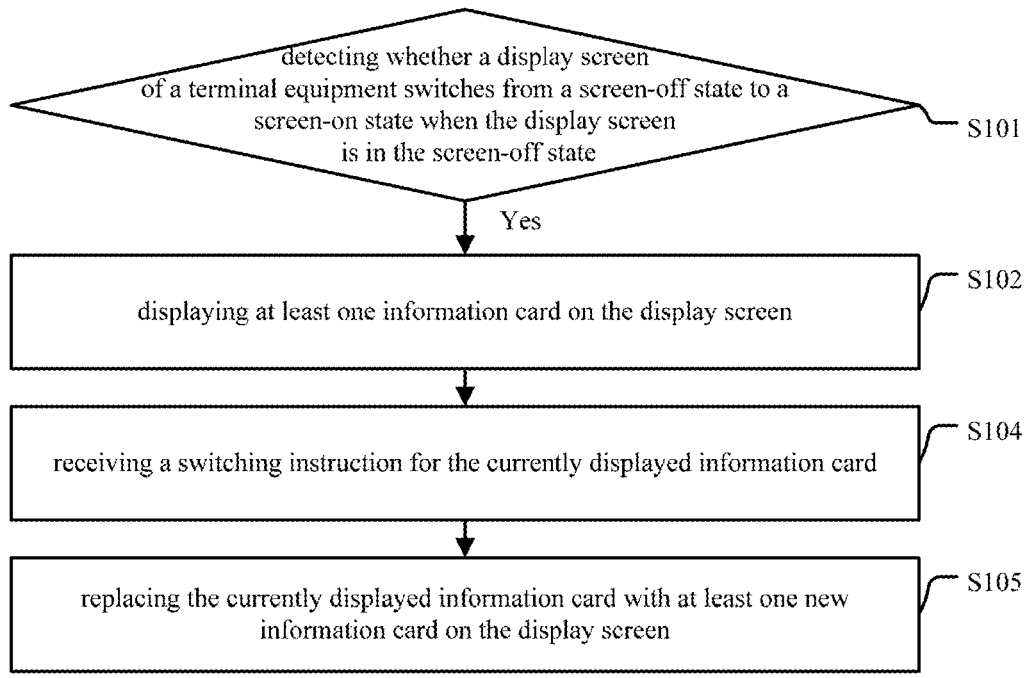
FIG. 3 is a schematic flowchart of a third method for displaying information provided by the embodiments of the present application.

In one implementation of the present application, refer to FIG. 3, which provides a schematic flowchart of a third method for displaying information. When compared to various embodiments above, in the present embodiment, the method further comprises:

S104: receiving a switching instruction for the currently displayed information card.

In terms of the generation of a switching instruction, the above switching instruction can be a user-input switching instruction for the currently displayed information card; and it can also be a switching instruction for the currently displayed information card which is generated according to preset instruction generation rules.

Wherein, the user-input switching instruction can be generated by a user clicking a switching button, and can also be generated by a user clicking a prompt information, wherein, the prompt information is used to remind the presence of other information cards.

The preset instruction generation rules can be to generate a card switching instruction periodically according to a fixed time interval. The above fixed time interval can be 3, 5, 10 seconds and the like.

In terms of switching directions, the switching instruction can be divided into a switching instruction for switching a card leftward (which can be referred to as a leftward switching instruction), a switching instruction for switching a card rightward (which can be referred to as a rightward switching instruction), a switching instruction for switching a card upward, and a switching instruction for switching a card downward.

In terms of the presentation of a switching instruction, the switching instruction can be divided into a switching instruction for leftward/rightward sliding, and a switching instruction for upward/downward sliding, wherein, the switching instruction for leftward/rightward sliding can be divided into a card switching instruction for leftward/rightward sliding horizontally, and a card sliding instruction for leftward/rightward sliding at a preset angle with a horizontal direction; the switching instruction for upward/downward sliding can be divided into a card switching instruction for upward/downward sliding horizontally, and a card sliding instruction for upward/downward sliding at a preset angle with a vertical direction. The above preset angle can be understood as an angle range;

In addition, the above switching instruction can be a switching instruction for clicking the buttons such as leftward/rightward/upward/downward.

It should be noted that this is only illustrated by way of example in the present application, and in the actual applications, the present application is not limited to the above content.

S105: replacing the currently displayed information card with at least one new information card on the display screen.

In a specific implementation of the present application, the above switching instruction comprises a rightward switching instruction and a leftward switching instruction; based on this, during the replacement of the currently displayed information card with at least one new information card on the display screen, if the switching instruction is a rightward switching instruction, moving the currently displayed information card rightward out of the display screen and moving at least one new information card into the display screen from left to right; if the switching instruction is leftward switching instruction, moving the currently displayed information card leftward out of the display screen and moving at least one new information card into the display screen from right to left.

It should be noted that, the above movement of the currently displayed information card rightward out of the display screen can be understood as moving the currently displayed information card rightward entirely out of the display screen, and can be understood as moving the currently displayed information card rightward partially out of the display screen. For example, when the currently displayed information cards are a plurality of information cards, it is possible to move the rightmost information card out of the display screen with other information cards moving rightward in order.

The movement of the currently displayed information card leftward out of a display screen is similar with that of the above situation, and will not be repeatedly described any more.

Optionally, the above rightward switching instruction can be understood as a switching instruction generated according to a rightward sliding operation on the display screen by a user;

the above leftward switching instruction can be understood as a switching instruction generated according to a leftward sliding operation on the display screen by a user.

In terms of the information displaying manner, in one implementation of the present application, during the replacement of the currently displayed information card with at least one new information card on a display screen, it is possible to directly replace the currently displayed information card with a new information card in a preset replacement manner at the location of the currently displayed information card; moreover, it is also possible for a new information cared to enter the display location of the currently displayed information card in a preset slide-in manner, so as to realize the replacement of an information card.

The above preset replacement manner can be the direct display of a complete information card after replacement, the explosive display of an information card after replacement, and the display of an information card after replacement with a slow downward movement and the like.

The preset slide-in mode can be slide-in in a straight line, slide-in according to a preset curve and fly-in and the like.

It can be seen from above that, in the solution provided by the present embodiment, cards are switched through the reception of a switching instruction, thus, it is possible to display information with more content to users.

Figure 4:
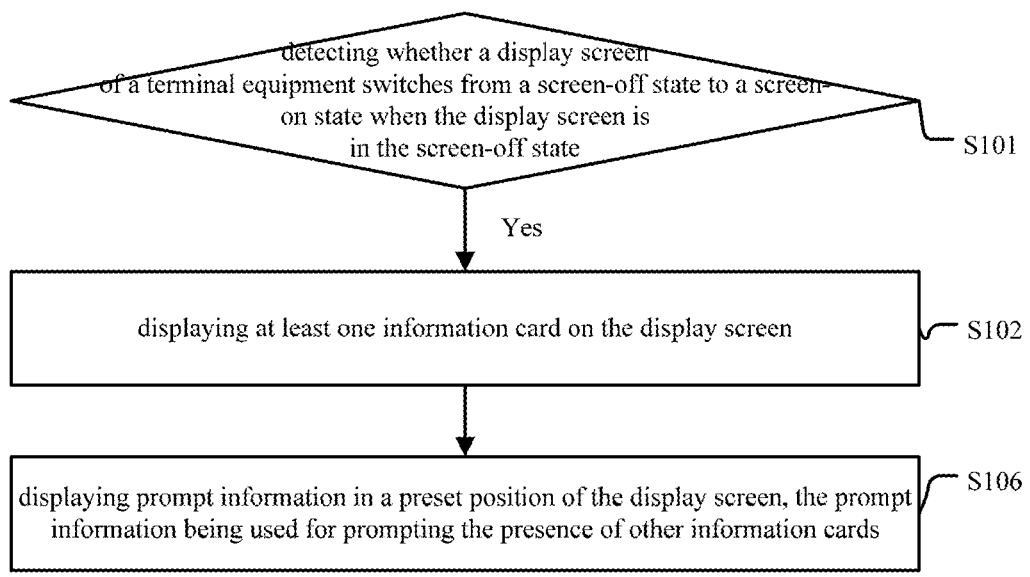
FIG. 4 is a schematic flowchart of a fourth method for displaying information provided by the embodiments of the present application.

In one implementation of the present application, refer to FIG. 4, which provides a schematic flowchart of a fourth method for displaying information. When compared to various embodiments, in the present embodiment, the method further comprises:

S106: displaying prompt information in a preset position of the display screen, the prompt information being used for prompting the presence of other information cards.

The above preset location can be:

a region between the left edge of the currently displayed information card and the left edge of a display screen, a region between the right edge of the currently displayed information card and the right edge of a display screen, a region between the upper edge of the currently displayed information card and the upper edge of a display screen, a region between the lower edge of the currently displayed information card and the lower edge of a display screen, a region which is on the left side of the display location of the currently displayed information card and one side of which is located in the left edge of a display screen, a region which is on the right side of the display location of the currently displayed information card and one side of which is located in the right edge of a display screen, a region which is on the upper side of the display location of the currently displayed information card and one side of which is located in the upper edge of a display screen, a region which is on the lower side of the display location of the currently displayed information card and one side of which is located in the lower edge of a display screen, a region of the currently displayed information card which is proximate to the left and right edges of the card, a region of the currently displayed information card which is proximate to the upper and lower edges of the card.

The above prompt information can be an image including prompt information (briefly referred to as a prompt image), a card including prompt information (briefly referred to as a prompt card), a button including prompt information (briefly referred to as a prompt button) and the like, for which the present application is not limited.

Specifically, the prompt card can be an information card of a smaller size than that of the currently displayed information card, wherein, the above prompt card can be an information card of a smaller width than that of the currently displayed information card and/or an information card of a smaller height than that of the currently displayed information card. Moreover, the above prompt card can display all the information required to be displayed by the corresponding information card of the prompt card, and can also display only part of the information.

In view of above, in a specific implementation of the present application, during the display of prompt information on a preset location of a display screen, it is possible to display a prompt card on the left boundary and/or right boundary of the display screen, wherein, the size of the prompt card is set according to the remaining size of the display screen which is the size obtained by subtracting the size of the currently displayed information card from the size of the display screen.

Figure 5B:
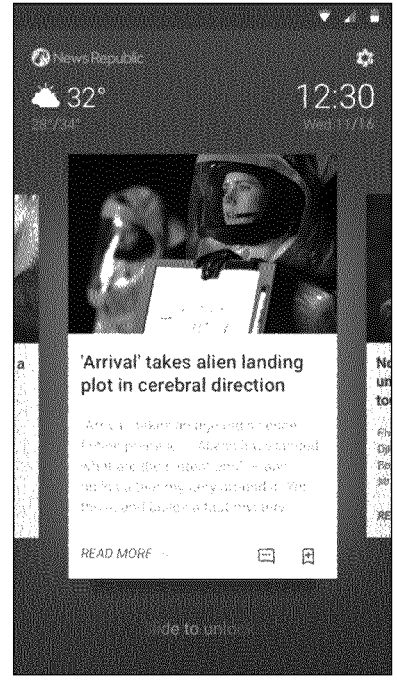

Specifically, refer to FIGS. 5a and 5b, wherein, FIG. 5a is an illustration in which only information cards are displayed without the display of prompt information; FIG. 5b is an illustration in which both prompt information and information cards are displayed.

It can be seen from above that, in the solution provided by the present embodiment, the prompt information is displayed on a preset location of a display screen, thus, users can quickly and conveniently acknowledge whether there are other information cards and thus view the information.

The switching of information cards in the case that prompt information is displayed will be introduced with FIGS. 5b-5e as an example below.

Figure 5C:
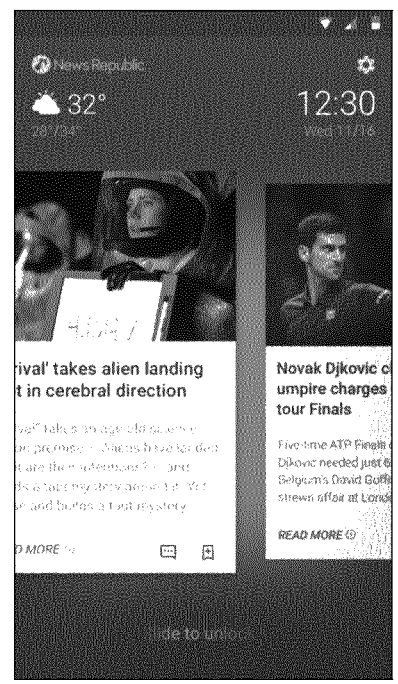
Figure 5D:

Specifically, it can be seen from FIG. 5b that there are other information cards both on the left and right sides of the currently displayed information card. FIGS. 5c and 5d show a process during which the currently displayed information card moves leftward out of a display screen and a new information card enters the display screen leftward. In this process, a new information card changes from a small prompt card to a size of a normally displayed information card as it enters the display screen, while the currently displayed information card changes from a size of a normally displayed information card to a small prompt card as it exits the display screen. FIG. 5e shows the illustration after the completion of switching.

In one implementation of the present application, the method for displaying information can further comprise:

receiving an interaction instruction for the currently displayed information card and performing an operation corresponding to the interaction instruction.

The interaction operation with the currently displayed information card can be in a plurality of forms, and thus description will be made below through various embodiments respectively.

It should be noted that the target card referred to in the following various embodiments can be understood as a card operated through an interaction instruction and included in the currently displayed information card.

The First Embodiment

When the interaction instruction is an information processing instruction, perform an operation corresponding to the interaction instruction, and specifically send input information corresponding to the information processing instruction to a program corresponding to a target card; and/or receiving the information sent by the program corresponding to the target card, updating and displaying the information on the target card.

At least one information card can be displayed on a display screen, thus the above currently displayed information card can be one or more than one. Normally, the above interaction instruction is only an interaction instruction for one information card, and thus the object operated by the above interaction instruction can be understood as the above target card.

In addition, the above input information can be personal status information published by a user, reply messages, published comments, forwarded messages and the like.

The Second Embodiment

When the interaction instruction is a card-moving-out instruction, perform an operation corresponding to the interaction instruction, and specifically move the target card out of the display screen.

Specifically, during the movement of a target card out of a display screen, the card can be moved upward out of a display screen, and can also be moved downward out of a display screen, for which the present application is not limited.

Optionally, it is possible to provide a deletion button in an information card, and the detection of a user clicking on this deletion button indicates the reception of a card-moving-out instruction. Alternatively, the card-moving-out instruction can also be an instruction generated according to a preset user gesture, and the reception of a card-moving-out instruction can be indicated by the detection of the above preset user gesture, such as a gesture of sliding an information card upward, a gesture of sliding an information card downward.

In a specific implementation of the present application, if a user moves an information card out of a display screen, the program corresponding to this information card can be considered as not being interested by the user, and thus, it is possible to mark this information card, and not to display this information card in the following display of information cards, thereby improving users' experience.

The Third Embodiment

When the interaction instruction is a size adjusting instruction, perform an operation corresponding to the interaction instruction, and specifically adjust the size of a target card on a display screen. In this case, it is possible to adjust the size of a target card on a display screen, or adaptively adjust the size of the displayed information on a target card during the adjustment of the size of the target card on a display screen.

When the above interaction instruction is a instruction of adjusting the number of cards, perform an operation corresponding to the interaction instruction, and specifically adjust the number of the currently displayed information card, for example adjust the number of the currently displayed information card on a display screen to two or three etc. from one, and adjust the number of the information cards displayed on a display screen to one from two, and the like.

When the interaction instruction is a display state adjusting instruction, perform an operation corresponding to the interaction instruction and specifically adjust the display state of information in a target card.

The above adjustment of information display status can be understood as text enlargement, text size reduction, information unfolding, information folding and the like.

The Fourth Embodiment

When the interaction instruction is a program jumping instruction, perform an operation corresponding to the interaction instruction and specifically jump to an application window corresponding to a target card.

A person skilled in the art can appreciate that the size of an information card is limited and thus the content that is capable of being displayed by it is also limited, therefore, when a user needs to view more detailed information, it is needed to jump to a program window corresponding to the information card.

Specifically, after jumping to the above application window corresponding to the above target card, it is possible to display the information related to the information displayed by a target card in an application window.

During the performance of operations corresponding to the above interaction instruction, it is also possible to firstly display an unlock interface to a user, and after the user has properly inputted unlock passwords on this interface, then jump to the application window corresponding to a target card, and display, in this application window, the information related to the information displayed by the above target card.

The Fifth Embodiment

When the interaction instruction is a card overturning instruction, perform an operation corresponding to the interaction instruction, and specifically overturn a target card and display target information on the overturned target card, wherein, the target information is the related information of the information displayed on the target card before being overturned.

For example, the information included in a target card before it is overturned is friends' chat information of the WeChat client, and the information included in a target card after it is overturned can be the friend's identity information and the like;

the information included in a target card before it is overturned is states of QQ friends, and the information included in a target card after it is overturned can be the comment details.

the information included in a target card before it is overturned is the amount of the remaining memory, and the information included in a target card after it is overturned can be detailed information of contents taken up by various programs in the current terminal.

Specifically, during the overturning of a target card, it is possible to overturn the entire card, or overturn only a part of the card.

According to the above description, the information card may include a multimedia resource displaying region and a text region, the multimedia resource displaying region being used for displaying multimedia resource information, and the text area being used for displaying text information. In this case, during the overturning of an information card, it is possible to overturn the text region, and the multimedia resource displaying region will not be overturned.

For example, when a target card displays information in a combined form of images and texts, during the overturning of the target card, it is possible to perform an overturning operation on a part of the target card that is used for displaying texts.

The Sixth Embodiment when the interaction instruction is a layout adjusting instruction, perform an operation corresponding to the above interaction instruction, and specifically, obtain at least two summary cards to be displayed and replace the currently displayed information card with the at least two summary cards.

wherein the content of each summary card is determined according to the information obtained from a program of the terminal equipment, the at least two summary cards include a summary card of the currently displayed information card.

Specifically, during the determination of content of a summary card according to the information obtained from a program of a terminal equipment, in one case, the information can be the entire information obtained from the program, in this case, when this information is displayed in a summary card, it can be displayed with its size reduced; in another case, the information can be partial information obtained from the program, such as image information, title of texts, brief introduction of content, in this case, when this partial information is displayed in a summary card, it can be displayed according to a preset interface layout manner, for example, the image is displayed on the left side of a summary card, and the text is displayed on the right side of a summary card.

In one implementation of the present application, the at least two summary cards can be arranged in a spaced manner. Then these summary cards can be uniformly arranged in an equally spaced manner, and can also be non-uniformly arranged, for which the present application is not limited.

A person skilled in the art can appreciate that, there may be a plurality of programs in a terminal equipment, and these programs can belong to different types according to different classification perspectives, for example, from the perspective of program functions, these programs can be divided into system management programs, shopping programs, entertainment programs, life service programs and the like. Based on this, when the at least two summary cards are uniformly arranged in an equally spaced manner, the summary cards can form a row of summary cards as viewed horizontally, the summary cards can form a column of summary cards as viewed vertically. Based on this, one row or one column of summary cards can correspond to one type of programs, such that users can conveniently find the summary card corresponding to the required program thereof according to the classification.

Specifically, it is possible to preset the maximum number of summary cards included in each row and/or each column of summary cards displayed on the display screen, for example, 3, 4, 5 and so on.

Assume that one row of summary cards correspond to one type of programs and the preset maximum number of summary cards included in one row of summary cards displayed on a display screen is 4. The numbers of summary cards corresponding to various types of programs as well as the number of summary cards in a row of summary cards displayed on the display screen are respectively as follows:

the number of summary cards corresponding to a system management program is 4; the number of summary cards displayed in this row is 4;

the number of summary cards corresponding to a shopping program is 3; the number of summary cards displayed in this row is 3;

the number of summary cards corresponding to an entertainment program is 2; the number of summary cards displayed in this row is 2;

the number of summary cards corresponding to a life service program is 6; the number of summary cards displayed in this row is 4.

From the above, the number of summary cards displayed in each row will be smaller than or equal to the preset maximum number of summary cards included in a row.

Moreover, when one row or column of the summary cards correspond to one type of program, it is also possible to display a classification identifier on a preset location, for example, to display a classification identifier on the upper left corner of a row of summary cards and to display a classification identifier on the top of a column of summary cards and the like.

Specifically, refer to FIGS. 5f to 5i, which are line drawings of an interface illustrating the process of replacing the currently displayed information cards with at least two summary cards. As seen from these four line drawings, after the reception of a layout adjusting instruction, the currently displayed information card gradually becomes smaller and is finally replaced with the corresponding summary card, other summary card gradually entering the display screen, and finally the summary card of the currently displayed information card and other summary cards are displayed on the display screen together. It should be noted, the process shown in FIGS. 5f to 5i is only one case of replacing the currently displayed information card with at least two summary cards, and the specific implementation of this replacing process is not limited in the present application.

In another implementation of the present application, the above at least two summary cards can be displayed in at least one column as a summary card queue, wherein summary cards in the summary card queue are arranged in a non-overlapping manner;

the at least two summary cards can be displayed in at least one line as a summary card queue.

Specifically, the summary card queue includes at least one summary card. Various summary cards in one summary card queue can be arranged in an equally spaced and non-overlapping manner, and can also be arranged in a non-equally spaced and non-overlapping manner, for which the present application is not limited.

Refer to FIGS. 5j to 5n, which are line drawings of an interface illustrating the process of replacing the currently displayed information cards with at least two summary cards. As seen from these five line drawings, after the reception of a layout adjusting instruction, the currently displayed information cards are gradually transformed into summary cards from a horizontal arrangement, and transformed into summary cards arranged vertically in a overlapping manner. During the overlapping and transforming processes, the summary cards gradually become smaller, and the summary cards of information cards that are not currently displayed gradually enter the display screen.

From the comparison of FIG. 5j and FIG. 5n, content in a summary card is only a part of content in an information card, the arrangement of images and texts in the summary card varies with respect to the arrangement of images and texts in the information card, and is transformed from a vertical direction into a horizontal direction.

It should be noted, the process shown in FIGS. 5j to 5n is only one case of replacing the currently displayed information card with at least two summary cards, and the specific implementation of this replacing process is not limited in the present application.

The process of adjusting the display of an information card as the display of a summary card after the reception of a layout adjusting instruction (hereinafter referred to as a first layout adjusting instruction) has been described above, specifically, it is also possible to adjust the display of a summary card into the display of an information card after the reception of another layout adjusting instruction (hereinafter referred to as a second layout adjusting instruction). Optionally, during the adjustment of the display of a summary card into the display of an information card, the information card can be an information card displayed before it is adjusted as the display of a summary card, and the information card can also be an information card corresponding to a new summary card that a user selected, for which the present application is not limited.

It should be noted that, various interaction instructions mentioned above in the first embodiment to the sixth embodiment can be generated by a user clicking on a corresponding button on an information card or generated by the detection of a corresponding gesture of users, for which the present application is not limited.

For example, when adjusting the size of a target card, a finger pinch gesture can represent a size reduction of the target card, and a finger separation gesture can represent an enlargement of the target card;

when moving a target card out, a upward sliding gesture on a display screen represents the target card being moved out;

When overturning a target card, a circling gesture on a display screen represents the target card being overturned;

During the layout adjustment, the above first layout adjusting instruction can be an instruction generated after the detection of a finger pinch gesture, and the above second layout adjusting instruction can be an instruction generated after the detection of a finger separating gesture. In this case, after adjusting the display of a summary card as the display of an information card, the displayed information card includes an information card displayed before the adjustment as the display of a summary card, and moreover, the above second layout adjusting instruction can also be an instruction generated by a user clicking on a summary card. In this case, after adjusting the display of a summary card as the display of an information card, the displayed information card includes an information card corresponding to the summary card on which the user clicks.

It should be noted that, it is only illustrated as an example of the present application, and the specific implementation of gestures is not limited in practical applications.

Corresponding to the above method for displaying information, embodiments of the present application further provide a schematic structural diagram of a device for displaying information.

FIG. 6 is a schematic structural diagram of a device for displaying information provided by the embodiments of the present application, which comprises:

a state detecting module 601, for detecting whether a display screen of a terminal equipment switches from a screen-off state to a screen-on state when the display screen is in the screen-off state;

a card displaying module 602, for displaying at least one information card on the display screen when the detection result from the state detecting module 601 is YES, wherein, the size of the information card is smaller than that of the display screen; each information card includes information obtained from a program of the terminal equipment.

Specifically, the card displaying module 602 can be specifically used for displaying at least one information card on the display screen horizontally.

Specifically, the information obtained from a program of the terminal equipment can comprise:

information obtained from a program of the terminal equipment before the display screen switches from the screen-off state to the screen-on state; or information obtained from a program of the terminal equipment after the display screen switches from the screen-off state to the screen-on state.

Specifically, the state detecting module 601 is specifically used for detecting whether a display screen of a terminal equipment switches from a screen-off state to a screen-on state when the display screen is in the screen-off state and the terminal equipment is in a locked-screen state.

It can be seen from above that, in the solution provided by various embodiments above, when it is detected that a display screen of a terminal equipment switches from a screen-off state to a screen-on state in the case that the display screen is in the screen-off state, at least one information card is displayed on the display screen, wherein, the size of the information card is smaller than that of the display screen; each information card includes information obtained from a program of the terminal equipment. The switching of a display screen from a screen-off state to a screen-on state means that the user may be free; in this case, information is displayed in a form of an information card, and the displayed information may be the required information for the user, thus the user can browse information during the his/her spare time, thereby improving the usage of user's spare time.

In one implementation of the present application, referring to FIG. 7, which provides a schematic structural diagram of a second device for displaying information. When compared to the above embodiment, in the present embodiment, the device for displaying information further comprises:

a period determining module 603 for determining whether the display screen is maintained in the screen-on state for a predetermined period after switching from the screen-off state to the screen-on state, and if so, triggering the card displaying module 602.

In this way, it can effectively avoid the information display resulting from lighting up a display screen due to the factors such as user's misoperation, viewing information for a short time and so on, thereby leading to an improved well-directed information display.

In one implementation of the present application, refer to FIG. 8, which provides a schematic structural diagram of a third device for displaying information. When compared to various embodiments above, in the present embodiment, the device for displaying information further comprises:

a first instruction receiving module 604, for receiving a switching instruction for the currently displayed information card;

a card replacing module 605, for replacing the currently displayed information card with at least one new information card on the display screen.

Specifically, the switching instruction comprises a rightward switching instruction and a leftward switching instruction;

the card replacing module 605 is specifically used for moving the currently displayed information card rightward out of the display screen and moving at least one new information card into the display screen from left to right if the switching instruction is a rightward switching instruction; and moving the currently displayed information card leftward out of the display screen and moving at least one new information card into the display screen from right to left if the switching instruction is leftward switching instruction.

Specifically, the rightward switching instruction can be a switching instruction generated according to a rightward sliding operation on the display screen by a user;

the leftward switching instruction can be a switching instruction generated according to a leftward sliding operation on the display screen by a user.

It can be seen from above that, in the solution provided by the present embodiment, cards are switched through the reception of a switching instruction, thus, it is possible to display information with more content to users.

Figure 9:
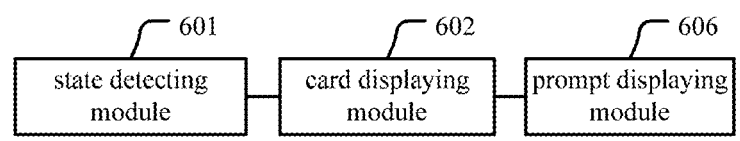
FIG. 9 is a schematic structural diagram of a fourth device for displaying information provided by the embodiments of the present application.

In one implementation of the present application, refer to FIG. 9, which provides a schematic structural diagram of a fourth device for displaying information. When compared to the above embodiment, in the present embodiment, the device for displaying information further comprises:

a prompt displaying module 606 for displaying prompt information in a preset position of the display screen, the prompt information being used for prompting the presence of other information cards.

Specifically, the prompt displaying module 606 is specifically used for displaying a prompt card on the left boundary and/or right boundary of the display screen, wherein, the size of the prompt card is set according to the remaining size of the display screen which is the size obtained by subtracting the size of the currently displayed information card from the size of the display screen.

It can be seen from above that, in the solution provided by the present embodiment, the prompt information is displayed on a preset location of a display screen, thus, users can quickly and conveniently acknowledge whether there are other information cards and thus view the information.

Based on various embodiments above, in one implementation of the present application, the device for displaying information can further comprise:

a second instruction receiving module, for receiving an interaction instruction for the currently displayed information card;

an operation performing module, for performing an operation corresponding to the interaction instruction.

Specifically, the interaction instruction is an information processing instruction;

the operation performing module is specifically used for sending input information corresponding to the information processing instruction to a program corresponding to a target card, wherein, the target card is a card among the currently displayed information cards at which the interaction instruction is directed; and/or the operation performing module is specifically used for receiving the information sent by the program corresponding to the target card, updating and displaying the information on the target card.

Specifically, the interaction instruction is a card-moving-out instruction;

the operation performing module is specifically used for moving the target card out of the display screen, wherein, the target card is a card among the currently displayed information cards at which the interaction instruction is directed.

Specifically, when the interaction instruction is a size adjusting instruction, the operation performing module is specifically used for adjusting the size of the target card on the display screen, wherein, the target card is a card among the currently displayed information cards at which the interaction instruction is directed; or when the interaction instruction is a instruction of adjusting the number of cards, the operation performing module is specifically used for adjusting the number of the currently displayed information card; or when the interaction instruction is a display state adjusting instruction, the operation performing module is specifically used for adjusting the display state of information in the target card.

Specifically, the interaction instruction is a program jumping instruction;

the operation performing module is specifically used for jumping to an application window corresponding to the target card, wherein, the target card is a card among the currently displayed information cards at which the interaction instruction is directed.

Specifically, the interaction instruction is a layout adjusting instruction;

the operation performing module can comprise:

a card obtaining submodule for obtaining at least two summary cards to be displayed, wherein the content of each summary card is determined according to the information obtained from a program of the terminal equipment, and the at least two summary cards include a summary card of the currently displayed information card;

a card replacement submodule for replacing the currently displayed information card with the at least two summary cards.

Optionally, the at least two summary cards can be arranged in a spaced manner.

Optionally, the at least two summary cards can be uniformly arranged in an equally spaced manner.

one row or one column of summary cards correspond to one type of program.

Optionally, the at least two summary cards can be displayed in at least one column of summary card queue, wherein summary cards in the summary card queue are arranged in a non-overlapping manner; or the at least two summary cards can be displayed in at least one row as a summary card queue.

Figure 10:
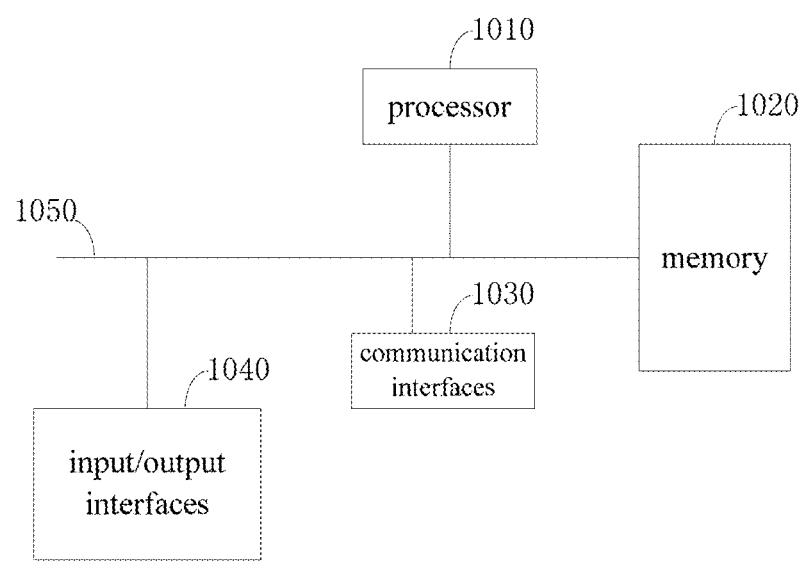
FIG. 10 is a schematic structural diagram of a terminal equipment provided by the embodiments of the present application.

FIG. 10 is a schematic structural diagram of a terminal equipment provided by the embodiments of the present application, which comprises: a processor 1010, a memory 1020, a communication interface 1030, an input/output interface 1040 and a bus 1050, wherein the processor 1010, the memory 1020, the communication interface 1030 and the input/output interface 1040 are connected to the bus 1050 respectively, the memory 1020 being used for storing executable program codes; the possessor 1010 executing a program corresponding to the executable program codes by reading the executable program codes stored in the memory 1020, so as to perform the method for displaying information provided by the embodiments of the present application.

Specifically, the above method for displaying information comprises:

detecting whether a display screen of a terminal equipment switches from a screen-off state to a screen-on state when the display screen is in the screen-off state;

if so, displaying at least one information card on the display screen, wherein, the size of the information card is smaller than that of the display screen; each information card includes information obtained from a program of the terminal equipment.

Regarding the specific process of the processor 1010 performing the above steps and the steps performed by the processor 1010 through operating executable program codes, reference can be made to the related description of the method provided by the embodiments of the application, which will not be repeatedly described here.

Wherein a display screen of a terminal equipment acts as the input/output interface when the display screen is a touch screen; and a display screen of a terminal equipment acts as the output interface with a keyboard and/or a mouse as the input interface when the display screen is a non-touch screen.

The terminal equipment is present in a variety of forms, which comprises but is not be limited to:

(1) a mobile communication equipment: this kind of equipment is characterized in ability of mobile communication and mainly aims to provide voice and data communication. This kind of terminal comprises: smartphones (e.g. iPhone), multimedia phones, functional phones and low-end phones and the like.

(2) an ultra-mobile personal computer equipment: this kind of equipment belongs to the category of personal computer, which has the function of computing and possessing and generally possesses mobile networking property. This kind of terminal comprises: PDA, MID and UMPC equipments and the like, for example, iPad.

(3) a portable entertainment equipment: this kind of equipment can display and play multimedia content. This kind of equipment comprises: audio and video players (for example, iPod), handheld game consoles, e-books and intelligent toys and portable vehicle navigation equipments.

(4) other electronic devices with data interaction function.

Regarding other embodiments of the method for displaying information, reference can be made to the above method part and no repeated description will be made here.

It can be seen from above that, in the solution provided by various embodiments above, when it is detected that a display screen of a terminal equipment switches from a screen-off state to a screen-on state in the case that the display screen is in the screen-off state, at least one information card is displayed on the display screen, wherein, the size of the information card is smaller than that of the display screen; each information card includes information obtained from a program of the terminal equipment. The switch of a display screen from a screen-off state to a screen-on state means that the user may be free, and in this case, information is displayed in a form of an information card, and the displayed information may be the required information for the user, thus the user can browse information during the his/her spare time, thereby improving the usage of user's spare time.

Corresponding to the above method for displaying information provided by the above embodiments, the embodiments of the present application further provide an application program, which is used for performing the method for displaying information provided by the embodiments of the present application in operation.

Specifically, the above method for displaying information comprises:

detecting whether a display screen of a terminal equipment switches from a screen-off state to a screen-on state when the display screen is in the screen-off state;

if so, displaying at least one information card on the display screen, wherein, the size of the information card is smaller than that of the display screen; each information card includes information obtained from a program of the terminal equipment.

Regarding other embodiments of the method for displaying information, reference can be made to the above method part and no repeated description will be made here.

It can be seen from above that, in the solution provided by the present embodiment, the above application program is operated, so as to display at least one information card on the display screen, when it is detected that a display screen of a terminal equipment switches from a screen-off state to a screen-on state in the case that the display screen is in the screen-off state, wherein, the size of the information card is smaller than that of the display screen; each information card includes information obtained from a program of the terminal equipment. The switch of a display screen from a screen-off state to a screen-on state means that the user may be free, and in this case, information is displayed in a form of an information card, and the displayed information may be the required information for the user, thus the user can browse information during the his/her spare time, thereby improving the usage of user's spare time.

Corresponding to the above method for displaying information provided by the above embodiments, embodiments of the present application further provide a storage medium, which is configured to perform the method for displaying information provided by the embodiments of the present application.

Specifically, the above method for displaying information comprises:

detecting whether a display screen of a terminal equipment switches from a screen-off state to a screen-on state when the display screen is in the screen-off state;

if so, displaying at least one information card on the display screen, wherein, the size of the information card is smaller than that of the display screen; each information card includes information obtained from a program of the terminal equipment.

Regarding other embodiments of the method for displaying information, reference can be made to the above method part and no repeated description will be made here.

It can be seen from above that, in the solution provided by the present embodiment, the above executable codes stored in the above storage medium are executed, so as to display at least one information card on the display screen, when it is detected that a display screen of a terminal equipment switches from a screen-off state to a screen-on state in the case that the display screen is in the screen-off state, wherein, the size of the information card is smaller than that of the display screen; each information card includes information obtained from a program of the terminal equipment. The switch of a display screen from a screen-off state to a screen-on state means that the user may be free, and in this case, information is displayed in a form of an information card, and the displayed information may be the required information for the user, thus the user can browse information during the his/her spare time, thereby improving the usage of user's spare time.

The embodiments of a system, a device, an application program and a storage medium are briefly described and reference can be made to the description of the embodiments of a method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

It can be understood by a person skilled in the art that all or a part of steps in the implementations of the above method can be carried out by related hardware being instructed by programs, which can be stored in computer readable storage medium, such as ROM/RAM, disk and optical disk etc.

The embodiments described above are just preferable embodiments of the present application, and not indented to limit the present application. Any modifications, alternatives, improvements or the like within the spirit and principle of the present application shall be comprised in the protection scope of the present application.

What is claimed is:

1. A method for displaying information, wherein the method comprises:
   detecting whether a display screen of a terminal equipment switches from a screen-off state to a screen-on state when the display screen is in the screen-off state;
   determining whether the display screen is maintained in the screen-on state for a predetermined period after switching from the screen-off state to the screen-on state,
   after the display screen is maintained in the screen-on state for a predetermined period after switching from the screen-off state to the screen-on state:
      displaying at least one information card on the display screen, wherein the size of the information card is smaller than that of the display screen and each information card includes information obtained from a program of the terminal equipment,
      receiving an interaction instruction for the currently displayed information card, and
      performing an operation corresponding to the interaction instruction, wherein when the interaction instruction is an instruction to overturn an information card:
         the step of performing an operation corresponding to the interaction instruction comprises overturning the information card so as to show the reverse side of the information card and displaying information on the reverse side of the information card related to information displayed on the front side of the information card before overturning; and
         wherein when the information card comprises a multimedia resource display area and a text area, the step of performing an operation corresponding to the interaction instruction comprises overturning the text area of the information card but not overturning the multimedia resource display area so as to show the reverse side of the text area of the information card and displaying information on the reverse side of the text area of the information card related to information displayed on the front side of the text area of the information card before overturning.

2. The method according to claim 1, wherein, the step of displaying at least one information card on the display screen comprises:
   displaying at least one information card on the display screen horizontally.

3. The method according to claim 1, wherein, the information obtained from a program of the terminal equipment includes one of the following:
   information obtained from a program of the terminal equipment before the display screen switches from the screen-off state to the screen-on state; and
   information obtained from a program of the terminal equipment after the display screen switches from the screen-off state to the screen-on state.

4. The method according to claim 1, wherein, the step of detecting whether the display screen switches from the screen-off state to the screen-on state comprises:
   detecting whether the display screen switches from the screen-off state to the screen-on state when the terminal equipment is in a locked-screen state.

5. The method according to claim 1, wherein the method further comprises:
   receiving a switching instruction for the currently displayed information card; and
   replacing the currently displayed information card with at least one new information card on the display screen.

6. The method according to claim 5, wherein,
   the switching instruction includes a rightward switching instruction and a leftward switching instruction; and
   the step of replacing the currently displayed information card with at least one new information card on the display screen comprises:
      if the switching instruction is a rightward switching instruction, moving the currently displayed information card rightward out of the display screen and moving at least one new information card into the display screen from left to right;
      if the switching instruction is leftward switching instruction, moving the currently displayed information card leftward out of the display screen and moving at least one new information card into the display screen from right to left.

7. The method according to claim 1, wherein the method further comprises:
   displaying prompt information in a preset position of the display screen, wherein the prompt information is used for prompting the presence of other information cards.

8. The method according to claim 7, wherein, the step of displaying prompt information in a preset position of the display screen comprises:
   displaying a prompt card on the left boundary and/or the right boundary of the display screen, wherein, the size of the prompt card is set according to the remaining size of the display screen which is the size obtained by subtracting the size of the currently displayed information card from the size of the display screen.

9. The method according to claim 1, wherein,
   the interaction instruction is an information processing instruction; and
   the step of performing an operation corresponding to the interaction instruction comprises at least one of the following:
      sending input information corresponding to the information processing instruction to a program corresponding to a target card, wherein, the target card is a card among the currently displayed information cards at which the interaction instruction is directed; and
      receiving the information sent by the program corresponding to the target card, and updating and displaying the information on the target card.

10. The method according to claim 1, wherein, the step of performing an operation corresponding to the interaction instruction comprises one of the following:
   moving the target card out of the display screen when the interaction instruction is a card-moving-out instruction, wherein, the target card is a card among the currently displayed information cards at which the interaction instruction is directed;
   adjusting the size of the target card on the display screen when the interaction instruction is a size adjusting instruction, wherein, the target card is a card among the currently displayed information cards at which the interaction instruction is directed;
   adjusting the number of the currently displayed information cards when the interaction instruction is an instruction of adjusting the number of cards; and
   adjusting the display state of information in the target card when the interaction instruction is a display state adjusting instruction.

11. The method according to claim 1, wherein,
   the interaction instruction is a program jumping instruction; and
   the step of performing an operation corresponding to the interaction instruction comprises: jumping to an application window corresponding to the target card, wherein, the target card is a card among the currently displayed information cards at which the interaction instruction is directed.

12. The method according to claim 1, wherein,
   the interaction instruction is a layout adjusting instruction; and
   the step of performing an operation corresponding to the interaction instruction comprises:
   obtaining at least two summary cards to be displayed, wherein the content of each summary card is determined according to the information obtained from a program of the terminal equipment, the at least two summary cards includes an summary card of the currently displayed information card; and
   replacing the currently displayed information card with the at least two summary cards.

13. The method according to claim 12, wherein, the at least two summary cards are displayed in one of the following ways:
   the at least two summary cards are displayed in at least one column as a summary card queue, wherein the summary cards in the summary card queue are arranged in a non-overlapping manner; and
   the at least two summary cards are displayed in at least one row as a summary card queue.

14. A non-temporary non-transitory storage medium, wherein the non-temporary non-transitory storage medium is used for storing executable codes that are configured to perform the method for displaying information of claim 1.

15. A terminal equipment, wherein the terminal equipment comprises: a processor, a memory, a communication interface, an input/output interface and a bus, wherein the processor, the memory, the communication interface and the input/output interface are connected to the bus respectively, the memory is used for storing executable program codes; the possessor executes a program corresponding to the executable program codes by reading the executable program codes stored in the memory, so as to perform a method for displaying information, wherein the method for displaying information comprises:
   detecting whether a display screen of a terminal equipment switches from a screen-off state to a screen-on state when the display screen is in the screen-off state;
   determining whether the display screen is maintained in the screen-on state for a predetermined period after switching from the screen-off state to the screen-on state,
   after the display screen is maintained in the screen-on state for a predetermined period after switching from the screen-off state to the screen-on state:
      displaying at least one information card on the display screen, wherein the size of the information card is smaller than that of the display screen and each information card includes information obtained from a program of the terminal equipment,
      receiving an interaction instruction for the currently displayed information card, and
      performing an operation corresponding to the interaction instruction, wherein when the interaction instruction is an instruction to overturn an information card:
         the step of performing an operation corresponding to the interaction instruction comprises overturning the information card so as to show the reverse side of the information card and displaying information on the reverse side of the information card related to information displayed on the front side of the information card before overturning; and
         wherein when the information card comprises a multimedia resource display area and a text area, the step of performing an operation corresponding to the interaction instruction comprises overturning the text area of the information card but not overturning the multimedia resource display area so as to show the reverse side of the text area of the information card and displaying information on the reverse side of the text area of the information card related to information displayed on the text area of the information card before overturning.

16. The terminal equipment according to claim 15, wherein, the step of displaying at least one information card on the display screen comprises:
   displaying at least one information card on the display screen horizontally.

17. The terminal equipment according to claim 15, wherein, the step of detecting whether the display screen switches from the screen-off state to the screen-on state comprises:
   detecting whether the display screen switches from the screen-off state to the screen-on state when the terminal equipment is in a locked-screen state.

18. The terminal equipment according to claim 15, wherein, the method for displaying information further comprises:
   receiving a switching instruction for the currently displayed information card; and
   replacing the currently displayed information card with at least one new information card on the display screen.

19. The terminal equipment according to claim 18, wherein,
   the switching instruction includes a rightward switching instruction and a leftward switching instruction; and
   the step of replacing the currently displayed information card with at least one new information card on the display screen comprises:

if the switching instruction is a rightward switching instruction, moving the currently displayed information card rightward out of the display screen and moving at least one new information card into the display screen from left to right;

if the switching instruction is leftward switching instruction, moving the currently displayed information card leftward out of the display screen and moving at least one new information card into the display screen from right to left.

20. The terminal equipment according to claim 15, wherein, the method for displaying information further comprises:

displaying prompt information in a preset position of the display screen, wherein the prompt information is used for prompting the presence of other information cards.

21. The terminal equipment according to claim 20, wherein, the step of displaying prompt information in a preset position of the display screen comprises:

displaying a prompt card on the left boundary and/or the right boundary of the display screen, wherein, the size of the prompt card is set according to the remaining size of the display screen which is the size obtained by subtracting the size of the currently displayed information card from the size of the display screen.

22. The terminal equipment according to claim 15, wherein, the interaction instruction is an information processing instruction; and the step of performing an operation corresponding to the interaction instruction comprises at least one of the following:

sending input information corresponding to the information processing instruction to a program corresponding to a target card, wherein, the target card is a card among the currently displayed information cards at which the interaction instruction is directed; and receiving the information sent by the program corresponding to the target card, and updating and displaying the information on the target card.

23. The terminal equipment according to claim 15, wherein, the step of performing an operation corresponding to the interaction instruction comprises one of the following:

moving the target card out of the display screen when the interaction instruction is a card-moving-out instruction, wherein, the target card is a card among the currently displayed information cards at which the interaction instruction is directed;

adjusting the size of the target card on the display screen when the interaction instruction is a size adjusting instruction, wherein, the target card is a card among the currently displayed information cards at which the interaction instruction is directed;

adjusting the number of the currently displayed information cards when the interaction instruction is an instruction of adjusting the number of cards; and adjusting the display state of information in the target card when the interaction instruction is a display state adjusting instruction.

24. The terminal equipment according to claim 15, wherein, when the interaction instruction is a program jumping instruction, the step of performing an operation corresponding to the interaction instruction comprises: jumping to an application window corresponding to the target card, wherein, the target card is a card among the currently displayed information cards at which the interaction instruction is directed.

25. The terminal equipment according to claim 15, wherein, the interaction instruction is a layout adjusting instruction; and the step of performing an operation corresponding to the interaction instruction comprises:

obtaining at least two summary cards to be displayed, wherein the content of each summary card is determined according to the information obtained from a program of the terminal equipment, the at least two summary cards includes an summary card of the currently displayed information card; and replacing the currently displayed information card with the at least two summary cards.

26. The terminal equipment according to claim 25, wherein, the at least two summary cards are displayed in one of the following ways:

the at least two summary cards are displayed in at least one column as a summary card queue, wherein the summary cards in the summary card queue are arranged in a non-overlapping manner; and the at least two summary cards are displayed in at least one row as a summary card queue.

* * * * *